US012070690B2

United States Patent
Lee

(10) Patent No.: US 12,070,690 B2
(45) Date of Patent: Aug. 27, 2024

(54) SYSTEM FOR PROVIDING ITEM GENERATION SERVICE FOR GENERATING ARTIFICIAL INTELLIGENCE-BASED DYNAMIC GAME ENVIRONMENT

(71) Applicant: Sang Soo Lee, Gwangju-si (KR)

(72) Inventor: Sang Soo Lee, Gwangju-si (KR)

( * ) Notice: Subject to any disclaimer, the term of this patent is extended or adjusted under 35 U.S.C. 154(b) by 250 days.

(21) Appl. No.: 17/787,385

(22) PCT Filed: Dec. 22, 2020

(86) PCT No.: PCT/KR2020/018934
§ 371 (c)(1),
(2) Date: Jun. 20, 2022

(87) PCT Pub. No.: WO2021/133039
PCT Pub. Date: Jul. 1, 2021

(65) Prior Publication Data
US 2023/0015010 A1   Jan. 19, 2023

(30) Foreign Application Priority Data
Dec. 23, 2019  (KR) ........................ 10-2019-0172957

(51) Int. Cl.
*A63F 13/58*  (2014.01)
*A63F 13/69*  (2014.01)

(52) U.S. Cl.
CPC .............. *A63F 13/58* (2014.09); *A63F 13/69* (2014.09); *A63F 2300/5513* (2013.01)

(58) Field of Classification Search
CPC ... A63F 13/58; A63F 13/69; A63F 2300/5513
See application file for complete search history.

(56) References Cited

U.S. PATENT DOCUMENTS

| 7,025,675 B2* | 4/2006 | Fogel ...................... A63F 13/12 463/9 |
| 2010/0240458 A1* | 9/2010 | Gaiba ..................... A63F 13/42 463/36 |

(Continued)

FOREIGN PATENT DOCUMENTS

| JP | 2012-061087 A | 3/2012 |
| JP | 2012-513650 A | 6/2012 |

(Continued)

OTHER PUBLICATIONS

English Specification of 10-2019-0109639.
(Continued)

*Primary Examiner* — Steve Rowland
(74) *Attorney, Agent, or Firm* — ANTONIO HA & U.S. PATENT, LLC

(57) ABSTRACT

Provided is a system for providing an item generation service for generating an artificial intelligence-based dynamic game environment, the system comprising: a space database unit that collects topography and weather information of at least one area, converts the collected topography and weather information into 3D content, stores the 3D content, and includes a user interface for designing and setting a real estate object corresponding to at least one building or land; a character setting unit including a user interface for setting the gender, height, weight, and body type of a character, and setting a growth rate according to a training level; an item generation service providing server including an item generation unit for generating an item having the desired size, weight, design, resistance, hardness, and durability by combining at least one type of material; and a user terminal for defining and designing each of at least one attribute forming a space, a character, and an item (Continued)

in the item generation service providing server, and selling, purchasing, and exchanging a completed item.

10 Claims, 5 Drawing Sheets

(56) References Cited

U.S. PATENT DOCUMENTS

| | | | | |
|---|---|---|---|---|
| 2011/0294574 | A1* | 12/2011 | Yamada | A63F 13/52 463/43 |
| 2013/0079142 | A1* | 3/2013 | Kruglick | A63F 13/61 463/43 |
| 2019/0081848 | A1* | 3/2019 | Zou | H04W 4/026 |
| 2020/0001185 | A1* | 1/2020 | Eatedali | A63F 13/65 |
| 2020/0051460 | A1* | 2/2020 | Bedor | G09B 19/22 |
| 2024/0102981 | A1* | 3/2024 | Lemos | G01N 33/0062 |

FOREIGN PATENT DOCUMENTS

| | | |
|---|---|---|
| KR | 10-2009-0075926 | 7/2009 |
| KR | 10-1756504 | 7/2017 |
| KR | 10-1867082 | 6/2018 |
| KR | 10-2019-0109639 | 9/2019 |

OTHER PUBLICATIONS

English Specification of 10-2009-0075926.
English Specification of JP2012-513650A.
English Specification of JP2012-061087A.
English Specification of 10-1756504.
English Specification of 10-1867082.

* cited by examiner

SYSTEM FOR PROVIDING ITEM GENERATION SERVICE FOR GENERATING ARTIFICIAL INTELLIGENCE-BASED DYNAMIC GAME ENVIRONMENT

TECHNICAL FIELD

The present invention relates to a system for providing an item creation service for creating an artificial intelligence-based dynamic game environment and provides a platform where players themselves may create and trade desired game environments, characters, and items.

BACKGROUND ART

As computer games develop, games are changing into more popular entertainment, and various studies on, e.g., graphics, sound effects, and intelligence, are being conducted to satisfy more users. In particular, in the flow between the user and the game, rather than the one-way scheme that transfers the developer's intention to the user, the interactive scheme that interacts according to the characteristics of each user is recognized as a major concern. In particular, artificial intelligence techniques are used as great tools that enable new attempts, and game system artificial intelligence is used to change the game environment more dynamically, such as automatically generating terrain in the game. The game should be able to find novelty in the challenges presented by the game even in repeated interactions rather than a one-time experience and, from this point of view, the direction the game should ultimately aim for is clear.

In this case, methods for generating a user character in the game using artificial intelligence have been researched and developed. Korea Patent Application Publication No. 2019-0109639 (published on Sep. 26, 2019) discloses a configuration that may provide a service at runtime without post-processing by creating 3D content from a 2D image and may use high-level information with semantic properties of the created 3D content character, as an interface, to transform it into a different type of character or style or to impart an attribute to it.

However, the above-described configuration only helps to create the shape of a character by artificial intelligence but does not directly create an item or character in the game by imparting an attribute to it and thus fails to fully meet the user's needs. Further, as the game is repeated, the user gets more familiar with the pattern and may more easily find weaknesses and thus easily loses interest in the game. Resultantly, the game itself reduces its life cycle. Since the artificial intelligence schemes used in the game provide a static game environment, if the user encounters the context of the same stage, the user's action pattern does not change significantly. Therefore, a need exists for research and development of a platform capable of dynamically changing the game environment by creating an environment in which items desired by the user may be created spontaneously.

DETAILED DESCRIPTION OF THE INVENTION

Technical Problems

According to an embodiment of the present invention, there may be provided a method for providing an item creation service for creating an artificial intelligence-based dynamic game environment. A platform where the user himself may create a desired item or character is provided. The created item or character may be traded or may be directly applied to the game so that the game environment may dynamically be changed. A price may be determined based on the free market principle according to the supply and demand of items. Physical attributes of items may be defined using artificial intelligence. Thus, although an ordinary person, not a developer, makes the design, a real-world feel of a developer's level may be reproduced, and an ordinary person may easily make his/her desired game scenario or story or create items or characters. Thus, it is possible to provide an interactable, bi-directional game platform according to the characteristics of individual users. However, the objects of the embodiments are not limited thereto, and other objects may also be present.

Technical Solutions

As a technical means for achieving the foregoing objectives, according to an embodiment of the present invention, an item creation service providing system for creating an artificial intelligence-based dynamic game environment comprises an item creation service providing server including a space database collecting terrain and weather information about at least one area, converting the collected information into 3D content, storing the 3D content, and including a user interface for designing and setting a real property object corresponding to at least one building or land, a character setting unit including a user interface for setting a character's gender, height, weight, and body shape and setting a growth rate according to a training level, and an item creating unit creating an item having a desired size, weight, design, resistance, hardness, and durability by combining at least one type of material, and a user terminal defining and designing at least one attribute constituting a space, character, and item in the item creation service providing server and selling, purchasing, and exchanging a completed item.

Effects of the Invention

According to any one of the above-described means to address the problems, there may be provided a platform where the user himself may create a desired item or character is provided. The created item or character may be traded or may be directly applied to the game so that the game environment may dynamically be changed. A price may be determined based on the free market principle according to the supply and demand of items. Physical attributes of items may be defined using artificial intelligence. Thus, although an ordinary person, not a developer, makes the design, a real-world feel of a developer's level may be reproduced, and an ordinary person may easily make his/her desired game scenario or story or create items or characters. Thus, it is possible to provide an interactable, bi-directional game platform according to the characteristics of individual users.

MODE TO PRACTICE THE PRESENT INVENTION

Hereinafter, exemplary embodiments of the inventive concept will be described in detail with reference to the accompanying drawings. The inventive concept, however, may be modified in various different ways, and should not be construed as limited to the embodiments set forth herein. Like reference denotations may be used to refer to the same or similar elements throughout the specification and the drawings. However, the present invention may be implemented in other various forms and is not limited to the embodiments set forth herein. For clarity of the disclosure, irrelevant parts are removed from the drawings, and similar reference denotations are used to refer to similar elements throughout the specification.

In embodiments of the present invention, when an element is "connected" with another element, the element may be "directly connected" with the other element, or the element may be "electrically connected" with the other element via an intervening element. When an element "comprises" or "includes" another element, the element may further include, but rather than excluding, the other element, and the terms "comprise" and "include" should be appreciated as not excluding the possibility of presence or adding one or more features, numbers, steps, operations, elements, parts, or combinations thereof.

When the measurement of an element is modified by the term "about" or "substantially," if a production or material tolerance is provided for the element, the term "about" or "substantially" is used to indicate that the element has the same or a close value to the measurement and is used for a better understanding of the present invention or for preventing any unscrupulous infringement of the disclosure where the exact or absolute numbers are mentioned. As used herein, "step of A" or "step A-ing" does not necessarily mean that the step is one for A.

As used herein, the term "part" may mean a unit or device implemented in hardware, software, or a combination thereof. One unit may be implemented with two or more hardware devices or components, or two or more units may be implemented in a single hardware device or component.

As used herein, some of the operations or functions described to be performed by a terminal or device may be, instead of the terminal or device, performed by a server connected with the terminal or device. Likewise, some of the operations or functions described to be performed by a server may be performed by a terminal or device connected with the server, instead of the server.

As used herein, some of the operations or functions described to be mapped or matched with a terminal may be interpreted as mapping or matching the unique number of the terminal, which is identification information about the terminal, or personal identification information.

Hereinafter, embodiments of the disclosure are described in detail with reference to the accompanying drawings.

Figure 1:
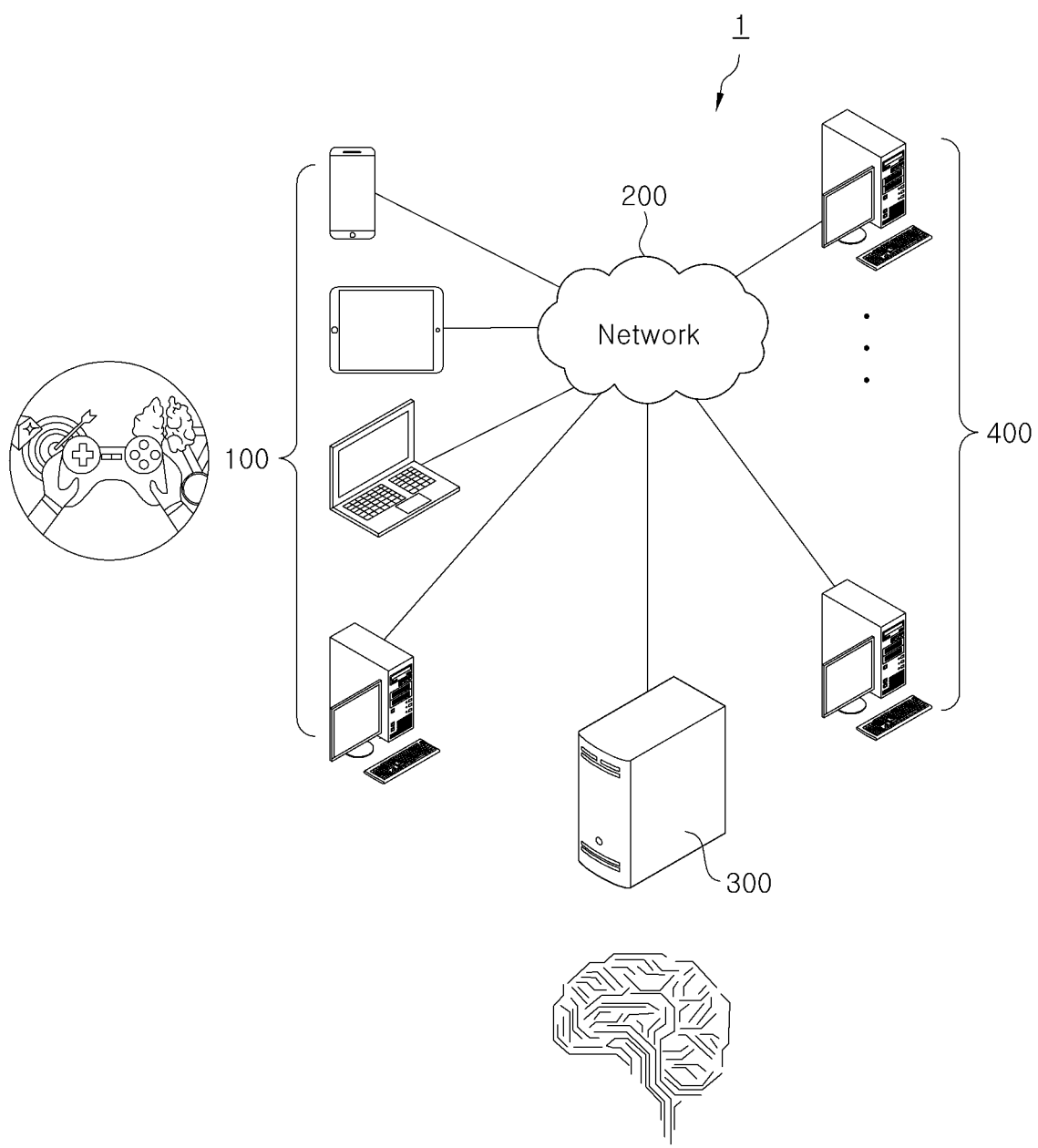
FIG. 1 is a view illustrating a system for providing an item creation service for creating an artificial intelligence-based dynamic game environment according to an embodiment of the present invention.

FIG. 1 is a view illustrating a system for providing an item creation service for creating an artificial intelligence-based dynamic game environment according to an embodiment of the present invention. Referring to FIG. 1, an item creation service providing system 1 for creating an artificial intelligence-based dynamic game environment may include at least one user terminal 100, an item creation service providing server 300, and at least one developer terminal 400. However, the item creation service providing system 1 for creating an artificial intelligence-based dynamic game environment of FIG. 1, is merely an example of the present invention, and the present invention is not limited by FIG. 1.

The components of the system 1 are connected together via a network 200. For example, referring to FIG. 1, the at least one user terminal 100 may be connected with the item creation service providing server 300 via the network 200. The item creation service providing server 300 may be connected with the at least one user terminal 100 and the at least one developer terminal 400 through the network 200. Further, the at least one developer terminal 400 may be connected with the item creation service providing server 300 through the network 200.

Here, the term "network" means a connecting structure to enable exchanging of information between nodes, such as a plurality of terminals and servers. Examples of such network may include, but are not limited to, a radio frequency (RF) network, a 3rd Generation Partnership Project (3GPP) network, a Long Term Evolution (LTE) network, a Long Term Evolution-Advanced (LTE-A) network, a 5th Generation Partnership Project (5GPP) network, a World Interoperability for Microwave Access (WIMAX) network, an Internet network, a Local Area Network (LAN) network, a Wireless LAN network, a Wide Area Network (WAN) network, a Personal Area Network (PAN) network, a Bluetooth network, a satellite broadcast network, an analog broadcast network, and a Digital Multimedia Broadcasting (DMB) network.

As used herein, the singular forms "a," "an," and "the" are intended to include the plural forms as well, unless the context clearly indicates otherwise. According to embodiments, a plurality of components of the same type may be a single component of the type, and one component may add one or more components of the same type.

The at least one user terminal 100 may be a player's terminal that configures a game space using a webpage, app page, program or application related to the item creation service for creating an artificial intelligence-based dynamic game environment and creates game characters and items. The user terminal 100 may be a terminal that creates items by using, or selling in the market, resources extracted or produced in the game space. The user terminal 100 may be a terminal that creates game characters and trains the game characters to obtain their respective level values. The user terminal 100 may be a terminal that sells created items or characters or purchases items or characters from others. In this case, the at least one user terminal 100 means multiple players' terminals. However, for convenience of description of the present invention, in the description herein, the user terminal 100 is set or defined as a subject that configures the space and creates characters and items, and the user who plays game with another user, as the opponent, is defined as the opponent of a battle game. The opponent's terminal also belongs to such user terminals 100, and the opponent's terminal is also able to fulfill all of the components of the user terminal 100.

The at least one user terminal 100 may be implemented as a computer capable of accessing a remote server or terminal via the network. Here, the computer may be, e.g., a navigation or web browser-equipped laptop computer or desktop computer. The at least one user terminal 100 may be implemented as a terminal capable of accessing a remote server or terminal via the network. The at least one user terminal 100 may be, e.g., a portable mobile wireless communication device examples of which may include navigation devices, a Personal Communication System (PCS), Global System for Mobile communications (GSM), Personal Digital Cellular (PDC), Personal Handyphone System (PHS), Personal Digital Assistant (PDA), International Mobile Telecommunication (IMT)-2000, Code Division Multiple Access (CDMA)-2000, W-Code Division Multiple Access (W-CDMA), Wireless Broadband Internet (WiBro) terminal, a smartphone, a smartpad, tablet PC, or any other various types of handheld wireless communication devices.

The item creation service providing server 300 may be a server that provides a webpage, app page, program, or application for an item creation service for creating an artificial intelligence-based dynamic game environment. The item creation service providing server 300 may previously build a user interface and a database, where the user terminal 100 may configure a space and create and train characters and create items, to prepare for the player's game design. In this case, the item creation service providing server 300 may be a server that receives a database structure or a program defining data inserted into the structure from the at least one developer terminal 400 and creates a database for game design by the user terminal 100. Here, since the user is not a game developer and mostly does not know the C language, an intuitive user interface is required when configuring and creating each space, character, and item. Accordingly, the item creation service providing server 300 may be a server that receives a definition of a user interface for game design from the at least one developer terminal 400. The item creation service providing server 300 may be a server that may compute and produce a computation algorithm corresponding to values set by the user terminal 100 and the physical, chemical, electrical, and mechanical principles of a pre-established database, based on artificial intelligence. The item creation service providing server 300 may set prices according to the management and economic principles using artificial intelligence. Further, the item creation service providing server 300 may grasp the supply and demand through a trading platform when the user terminal 100 tries to sell spaces, characters, or items, set prices, or adjust prices based on the times and prices invested in the spaces, characters, and items. The item creation service providing server 300 may be a server that relays real-time game context.

The item creation service providing server 300 may be implemented as a computer capable of accessing a remote server or terminal via the network. Here, the computer may be, e.g., a navigation or web browser-equipped laptop computer or desktop computer.

The at least one developer terminal 400 may be a developer's terminal that uses a webpage, app page, program or application related to the item creation service for creating an artificial intelligence-based dynamic game environment. The at least one developer terminal 400 may be a terminal that creates other items helping a character, required to train and grow the character, and upload the other items to the item creation service providing server 300. Further, the at least one developer terminal 400 may be a terminal that uploads and structures at least one data and program required to configure the space and create characters and item to the item creation service providing server 300. The at least one developer terminal 400 may be a terminal that applies a final artificial intelligence model, which has undergone learning, training, and experiments after an artificial intelligence algorithm was modeled by the item creation service providing server 300, to the item creation service providing server 300 or may be a terminal that has involvement and a contribution according to supervised learning, semi-supervised learning, and unsupervised learning in the case where feedback is collected.

The at least one developer terminal 400 may be implemented as a computer capable of accessing a remote server or terminal via the network. Here, the computer may be, e.g., a navigation or web browser-equipped laptop computer or desktop computer. The at least one developer terminal 400 may be implemented as a terminal capable of accessing a remote server or terminal via the network. The at least one developer terminal 400 may be, e.g., a portable mobile wireless communication device examples of which may include navigation devices, a Personal Communication System (PCS), Global System for Mobile communications (GSM), Personal Digital Cellular (PDC), Personal Handyphone System (PHS), Personal Digital Assistant (PDA), International Mobile Telecommunication (IMT)-2000, Code Division Multiple Access (CDMA)-2000, W-Code Division Multiple Access (W-CDMA), Wireless Broadband Internet (WiBro) terminal, a smartphone, a smartpad, tablet PC, or any other various types of handheld wireless communication devices.

Figure 2:
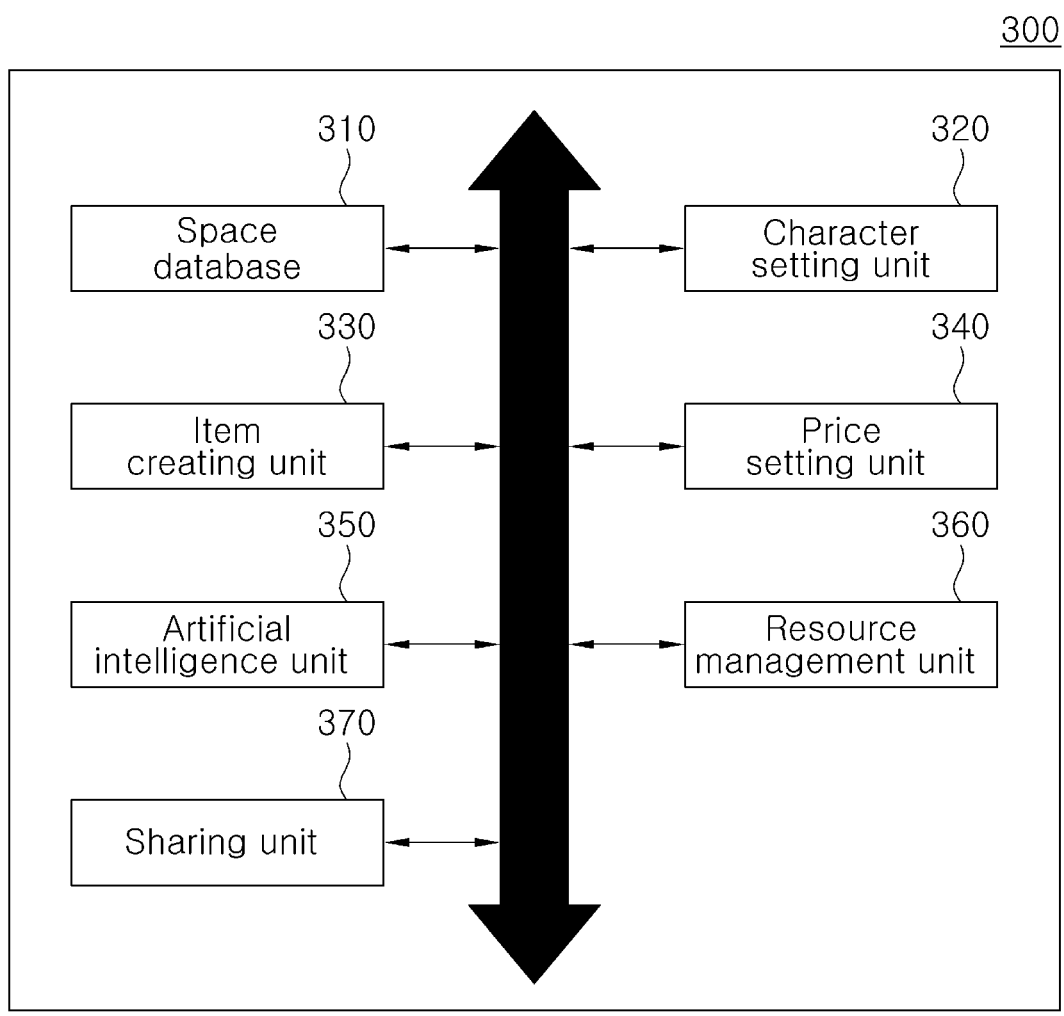
FIG. 2 is a block diagram illustrating a configuration of an item creation service providing server included in the system of FIG. 1.
Figure 3:
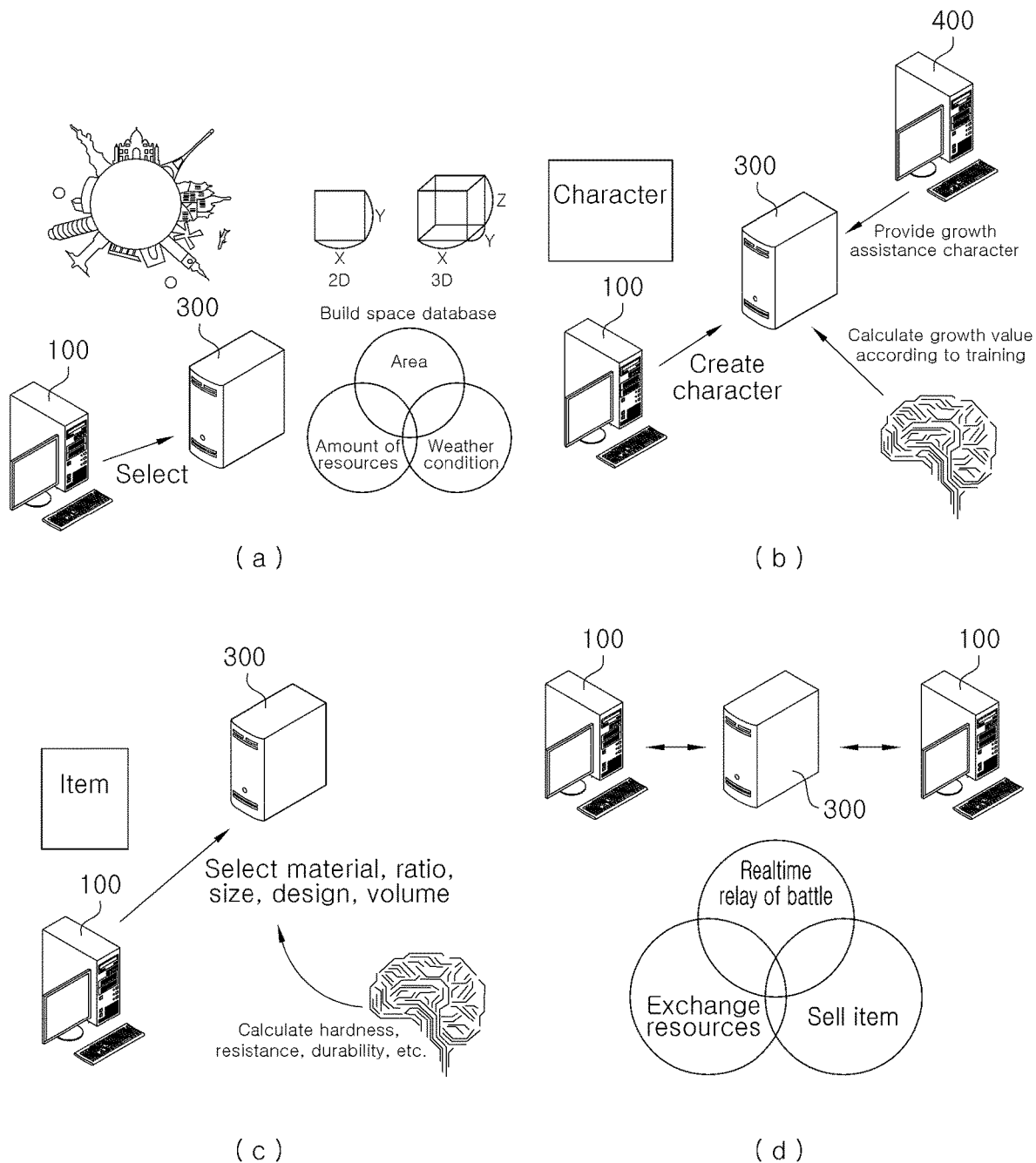
FIG. 3 is a view illustrating an example of implementing an item creation service for creating an artificial intelligence-based dynamic game environment according to an embodiment of the present invention.

FIG. 2 is a block diagram illustrating a configuration of the item creation service providing server included in the system of FIG. 1. FIG. 3 is a view illustrating an example of implementing an item creation service for creating an artificial intelligence-based dynamic game environment according to an embodiment of the present invention.

Referring to FIG. 2, the item creation service providing server 300 may include a space database 310, a character setting unit 320, an item creating unit 330, a price setting unit 340, an artificial intelligence unit 350, a resource management unit 360, and a sharing unit 370.

According to an embodiment of the present invention, when a server (not shown) interworking with the item creation service providing server 300 transmits an item creation service application, program, app page, or webpage for creating an artificial intelligence-based dynamic game environment to at least one user terminal 100 and at least one developer terminal 400, the at least one user terminal 100 and the at least one developer terminal 400 may install or open the item creation service application, program, app page, or webpage for creating an artificial intelligence-based dynamic game environment. Further, a service program may be driven on the at least one user terminal 100 and the at least one developer terminal 400 using a script executed on a web browser. Here, the web browser may be a program or application that enables use of world wide web (WWW) services or that receives and shows hypertext written in the hypertext mark-up language (HTML), and the web browser may include, e.g., Netscape, Explorer, or Chrome. The term "application" may mean an application executed on the terminal, and the application may include, e.g., an app running on a mobile terminal, e.g., a smartphone.

Referring to FIG. 2, the space database 310 may collect terrain and weather information about at least one area, convert it into 3D content and store the 3D content and may include a user interface for designing and setting real estate objects corresponding to at least one building or land. According to an embodiment of the present invention, the item creation service is to create items themselves, rather than simply adding or increasing items by playing through a person or a machine. In other words, the user enters the game developer's realm, and accordingly, the user may design and create his desired items, and the developer may understand the item the user wants. Thus, it is possible to actively reflect needs when the game is updated later. Thus, a method according to an embodiment of the present invention starts from configuring a space where the game is to be played, and this starts by the user directly selecting a space, rather than selecting one from among several options or using a static environment pre-established by the developer. To that end, the space database 310 may store the topography, locations, altitudes, coordinates, etc. of the world and, since it is required to reflect real-time weather conditions as well as data, such as natural and human resources of each area, weather data is also actually received through public API and applied.

To that end, the space database 310 may use a web crawler. In this case, the web crawler is a computer program that searches the world wide web in an organized and automated way. The task performed by the web crawler is called web crawling or spidering, and is a type of bot or software agent. There are two main types of web crawlers: general web crawlers and distributed web crawlers. The basic operation of the web crawler is described. The URL frontier module fetches the URL and fetches the webpage corresponding to the URL by using the http protocol. Then, the fetch module stores the webpage in temporary storage, and the parser module extracts the text and link. The text is sent to the indexer. Whether the link needs to be added to the URL frontier is determined via the content seen, URL filter, and duplication URL element modules.

In this case, since it is substantially impossible to crawl all data about areas, topography, weather, and resources around the world with a general web crawler, an embodiment of the present invention may use a distributed web crawler. Distributed web crawlers are largely divided into two types, one of which is a centralized type and the other is a P2P (or fully-distributed) type. In the centralized distributed web crawler, the URL manager may act as the server, and the crawler acts as the client. If the crawler downloads the document, extracts the outlink URL and transfers it to the URL manager, then the URL manager checks whether it is the URL of the downloaded document and removes URL duplication. In other words, the URL manager takes the place of the part of the general web crawler which performs URL duplication and URL management. Meanwhile, in the P2P type, each crawler has a completely independent structure. In the P2P type, each crawler operates like a general web crawler. Each crawler independently performs document download, outlink URL extraction, and URL duplication removal. To do this, downloaded URL lists managed by the crawlers should be exclusive from other. Otherwise, such an occasion where different crawlers download the same document may occur. To address this, the crawlers may divide and manage the URL domains for download exclusively from each other. In other words, each crawler manages only ones belonging to the download domain and transfers the other URLs to other crawlers. When such a method is used, each crawler may independently operate.

Next, web content should be extracted. A web content extraction technique provides the function of automatically extracting the contents, such as the title, author, publication date, and body, to be used for information analysis, from the web document. The web content extraction system is a device that automatically generates a rule for extracting content and extracts only content and may include a rule generator that automatically generates a content extraction rule, a navigation content eliminator that eliminates navigation content from a given web document, and a core content extractor that extracts content through content extraction rule keyword similarity comparison. Further, although there are cases where weather data or topographic data are described in text, most of them are satellite data using lidar or radar. In this case, there is a case where it is necessary to collect structured data from unstructured data as well as structured data. To that end, the crawler according to an embodiment of the present invention may determine the tag of the collected data according to the data type defined in the rule. Since HTML tags are described differently according to multimedia data, a tag may be attached to each of video, image, and audio and, if each image includes text, the text may be extracted by an image recognition algorithm for recognizing text from images.

For example, in the case of the space database, it is required to secure spatial databases according to 2D and 3D as described above. In a distributed computing environment, data may be distributed and stored. Further, if the user selects the Boracay area of the Philippines, the user may build a hotel he wants or decorate a coconut or mango farm in his desired manner and may make settings to prevent intrusion by other users, i.e., the opponent player. As described above, the space may be based on an actual value or based on a virtual setting value. Further, since the space selected by the user is configured based on the actual natural topography, actual weather information, e.g., no sail of all types of ships and boats, flight delay, and no entry/exit to/from the island due to Typhoon Kammuri on Dec. 2, 2019, may be used, as it is, or may be applied in real-time in such a manner in which the invading enemy cannot approach due to due to Typhoon Kammuri on December 2. Further, there was significant damage to crops due to a typhoon in October, which caused a rise in mango prices. In this case, the mango price has actually risen, and this may be applied, as it is, to set the price, or the market price volatility may be followed as it is. Here, even human damage may be applied as it is.

The character setting unit 320 may include a user interface to set the character's gender, height, weight, and body type and set the growth rate according to the training level. The character setting unit 320 may set at least one parameter so that the power level, the attack level, and the resourcefulness level are changed as the character grows and trains. The character setting unit 320 may grow the character using at least one, or a combination of at least one of, a general trainer, a special trainer, a nutritionist, a teacher, and a mentor provided by the developer terminal 400 interworking with the item creation service providing server 300. Further, the character setting unit 320 may include a character creation module. The character creation module is a module necessary to create a new character and, besides characters created as samples by the developer terminal 400, add a character customizing system. The character customizing system is a system that creates the character to have the appearance that the user wants in detail, such as race, occupation, height, physique, chest circumference, skin color, hair style, hair color, face type, face outline, eyes, pupil size, eye color, eyebrows, nose shape, mouth shape, lip color, spots and scars, tattoos, tattoo color, face ornament, face ornament color, voice type, and many more. Of course, in addition to the appearance features, various levels as described above may be further included.

For example, the character setting page is a space where the user creates a desired character. If the user wants to create a warrior, he/she sets the basics, such as the warrior's height, weight, and appearance and continues to manage the character so that the character is able to grow. Assuming that the weight of the sword used by the warrior is 100 kg, the character should be trained and have the muscles to be able to use the 100 kg sword to exert the optimal power. To that end, the character setting page supplies, e.g., a general trainer and premium trainer, a nutritionist, a teacher, or a mentor, supplied by the developer terminal 400. Thus, the user's character may grow in the power level, attack level, and resourcefulness level. Here, the power level refers to the power that the character has, and the power of the character and the value of the item are combined to exert more power. In the case of the attack level, such a function as a special move is exerted, and depending on the item, the special move may be more powerful. In the case of resourcefulness level, a range in which the subordinates and allies may be governed is set depending on the resourcefulness level, and the resourcefulness level is the ability to effectively control the subordinates and allies. Through such a well-grown character, the user may rule a wider area and may apply his desired social system. For example, social systems, such as capitalism, socialism, and social compensation systems and taxation, conscription are determined by the user's settings.

Further, the character setting unit 320 may further apply a method for supporting the player to achieve characterization appropriate for the player as the player's unique character grows, by inferring the player's style through the Petri net module. A task that provides complex interactions between many variables in a game is very important. In particular, it should be basically performed to express action items that are a result of player action history analysis and a prerequisite for growth, and the form of linkage between action and growth. In this case, the Petri net is a concept for modeling a simultaneous parallel system expressed in a schematic form with some lines and is suitable for expressing the flow of information in a simplified manner as possible. The standard Petri net consists of places, transitions, and tokens. Tokens move from a place through a transition to another place. If at least one input token is in each input place of the transition, the transition is enabled, and any enabled transition may fire as one token is put in each input place. The choice of transition is not deterministic, which is why it is useful for modeling protocols. Meanwhile, a finite-state machine (FSM), also known as finite automaton, is a mathematical model used to design computer programs and electronic logic circuits. This may be said to be an abstract machine that may have a finite number of states. Such a machine may have only one state at a time, and the current state refers to the state at any given time. Such a machine may change from one state to another by an event, and it is called a transition. A specific FSM is defined as a set of possible transition states from the current state and the conditions that cause this transition.

In this case, basically, it is necessary to infer the player's style based on the player's playing history. Of course, the method for inferring the player's style based primarily on the counting of the player's action classification is not entirely accurate but is necessary to provide a suitable growth environment for the player. This is why, if such a process is excluded, the system will be reduced to a meaningless system that simply randomly changes the player's character tendency. Accordingly, based on the style inference result, it is possible to set a specific form for the growth of the character, that is, the linkage model in which the growth is made.

First, inference of the player's style is performed. The player's playing style is classified to determine the growth type. The basic idea is to infer the most appropriate play style for the player based on the actions the player have taken the most. It is first required to define a combination of actions taken by the player and the playing style that may be inferred according to the combination. According to the diversity of characterization, the number of actions to be considered increases, and accordingly, it is necessary to express numerous relational forms. The Petri net is suitable to represent the interaction between these many factors and provides easy-to-test features for a variety of situations. Through the Petri net module, it is possible to effectively represent the players' actions and accordingly inferred playing styles. When tokens that indicate that preconditions, as conditions (clause) for specific growth, are met are prepared, the Petri net module infers the player's playing style, determines the transition related to the growth as the growth type, and accordingly allows growth to be made.

A plurality of condition places may be used as condition places for the same growth, or a single condition place may be used as a condition place for a plurality of growth places. The complexity of such complicated connection relational form is sharply increased as the size increases and forms a congested graph structure that permits a plurality of parents and a plurality of children. Thus, a control protocol for effectively controlling it is needed. The Petri net may effectively represent the inference of the playing style through a process of determining the player style through satisfaction of the conditions corresponding to the players' actions and tokens corresponding to the preconditions as mentioned above and transitions referencing the plurality of conditions.

If the growth type is so determined, it is not immediately applied but, rather than that, a specific growth type is considered. Basically, the growth type is largely determined by the results of a pre-defined plan. It may be expanded more broadly according to the intentions of the game developer and user, but basically the following growth type items should be considered. First, adjustment between the character's characterized growth and the overall balanced growth is needed. When the player's propensity is determined to be close to a certain characteristic, in addition to development of the ability corresponding to the characteristic, the ability corresponding to a more distant characteristic should be developed to some extent. If the growth type is determined only with the above-described playing style inference model, growth too imbalanced to a specific ability may be made. Accordingly, in determining the player's growth type, not only the characteristic closest to the player but all other characteristics are considered.

The ability enhancing rate according to the overall growth level of the character may be considered as well. Choices are divided depending on the planning intention of the game. For example, for a one-shot game with a short character life cycle, the player should be encouraged to preempt advantages by faster level-up than other players in the game, and excessive disparities in ability values according to levels should be avoided. In contrast, for MMORPG with a long character lifespan, the player should be encouraged to continuously sue the service by allowing him to feel happy from growing the character. Besides, the growth may be applied immediately or via an intermediate quest depending on the planning intention. Or, if more intuitiveness is to be added to the system, an interface may be provided to allow the users to check the numerical value for the growth level of the character.

An example of a process for inferring and applying the player's propensity through the above-described configuration is described. To infer the player's style based on the Petri net, the character's action pattern, which corresponds to the condition place of the Petri net, the character growth type, which corresponds to the growth place, and the transition, which means the logical relationship between the condition place and the growth place, may be defined based on the character's attributes previously defined. If a logical mid place is needed between condition and growth, a mid place may be added by adding a depth. The depth of the growth place which corresponds to the final growth type determination is set as a root node of 0, and the terminal node is set as the player's action pattern, and condition places are stored based on depths. In this case, the nodes may be stored in a map type to facilitate access to any condition places. After generating and storing each condition place node, a transition should be generated to represent the logical correlation between condition place and growth place. If a relationship with transaction is defined in the node, overall modeling of the Petri net system may be completed by recursive check that starts from the root node.

Further, to map with actual game elements through the above-described system, elements in the game should be pre-defined, and the definition of the relationship between condition place and growth place based on the attributes of the pre-defined game elements may be added. In this case, the player type derivation relationship by the player's most basic action pattern may be transferred through the interpersonal relationship. On top of that, how much each action pattern contributes to deriving a certain result or the type when the derivation of the result is influenced by a combination of action patterns, not a single action pattern, may be diagrammed through Petri net modeling. For example, assuming that the player's playing style prefers a guerrilla battle where fighting occurs at a far distance, actions performed at the far distance during battle may be the bases for such style inference. However, guerrilla battle preferred style inference which assumes only get-hit's at the far distance loses reliability by the nature of the guerrilla battle that should avoid get-hit's. For example, in a transition structure for determining the guerrilla battle style, there are two mid conditions; price-related condition and get hit-related condition. The get hit-related condition may be merged with a hit at far distance condition, actually reflecting the above-described logical bases.

As a result, the player's action is detected through direct communication with the game platform and is converted into a form of the condition place node used as a clue in player style inference. According to the growth determination of the player determined by the player style inference, the attribute of the character to which growth is to be actually applied is determined, the actual growth amount of the character attribute is determined, and the character's action is converted into a clue for player style inference. Then, to determine the character growth type, a token is added to the corresponding node, and a transition to a transitionable node is performed using the corresponding node as a seed. Performing transitions while searching all nodes in the Petri net costs a lot. Thus, a transitionable check first searches output transitions of the nodes (places) where tokens are added. It is checked whether all of the input nodes of the corresponding transitions have tokens while searching each transition. Then, if a prepared transition is found, search is stops, and the corresponding transition is performed. If a prepared transition is not found until all transitions are searched, the check is terminated. If a prepared transition is found, and thus, search is stopped, and the token is transitioned, the above-described process may be recursively performed on the token-added node. If the transition finally occurs up to the growth determination node which corresponds to the root node via the above-described process, an actual growth type is determined through growth type determination. Of course, the present invention is not limited to the above-described method, and it is obvious that character growth and training is possible in various methods.

The item creating unit 330 may combine at least one type of material, creating an item with a desired size, weight, design, resistance, hardness, and durability. Accordingly, the user terminal 100 may define and design at least one attribute of the space, character, and item and sell, purchase, and trade a completed item, on the item creation service providing server 300. Here, the item creating unit 330 may include weapons, armor, accessories, usability items, and persistence items, and in the case of a weapon, the data value of one weapon may have a plurality of pieces of information, such as the type of the weapon, the material of the weapon, attack power, durability, ability value, and characteristic value according to the settings.

Further, in the case of the item creation base of the item creation unit 330, all data values are set as default or collected for calculation by the artificial intelligence unit 350. In the case of the design, it has engineering values, such as size, weight, and resistance and is designed considering various values, such as hardness and durability according to components, and difficulty according to processing. All materials required at the item creation base may include materials supplied through transactions between users and materials supplied by the game operator. When the user completes the item he developed, the user may advertise and sell the item in the game or may use it while allowing it to be identified by other users. In other words, if the user who is an item developer does not sell the developed item on advertisement, the developed item is not exposed to other users. Thus, the user may subdue other users with items, e.g., secret weapons, and expand his realm. Further, although looking similar, swords developed at the item creation base have different strengths and durability values depending on the materials used and thus their influences on the opponent in the battle between users differ. For example, due to a difference between the data value for a sword formed of iron and the data value for a sword formed of copper, the artificial intelligence unit 350 assigns higher attackability and durability to the iron sword. Further, since the data values for speed and portability differ depending on how easy-to-use the swords have been designed although the swords are formed of the same material, the user should develop items with better materials and meticulous design, and the system may encourage the user to develop better items.

The item creation bases may be subdivided. For example, the item creation bases may be subdivided into blacksmiths, woodworks, brick factories, farms, orchards, fish farms, and assembly factories, and be set to allow the user to outsource for parts for his desired item. For example, when massive weapons are required, the user may outsource his cooperative users and receive many weapons and effectively proceed with the game. Further, when the user is shorthanded for creation, the user may hire workers through the operator and be helped by other cooperative users. To be able to create items, the item creation base may be provided with basic design tools and add diversified functions according to the version of the item creation base.

The item creation base may design and create items based on one item and, for all created items, the same items with the same computation value initially issued from the artificial intelligence unit 350 are created. When the item creation base creating items tries to create different items, all the creation process is stopped, and a new process is started from design and material selection. At the item creation base, price volatility according to the supply and demand for materials is applied so that the material prices are varied in real-time. Such a strategy as to purchase materials at further reduced prices and create items using the price volatility is also possible.

Accordingly, the price setting unit 340 may adjust the price to the price corresponding to the point where the supply and demand curves meet, based on the supply and demand for the items created by the user terminal 100. In this case, the price setting unit 340 may set the price of the item to correspond to the real-time material price of the item created by the item creating unit 330.

The artificial intelligence unit 350 may calculate and quantify the resistance, hardness, and durability corresponding to the material, material component, component ratio, size, and weight of the item created by the item creating unit 330 and may generate and assign item attribute values including use distance, attack power, destructive power, durability, defense power, and attack level enhancement power corresponding to the quantified data. In this case, the artificial intelligence unit 350 may generate and assign an item attribute value to correspond to the real-time material price of the item created by the item creating unit. The artificial intelligence unit 350 calculates data values, such as material, engineering design, weight, length, etc. used for the items created at the item creation base and assigns the use distance and attack ability, destructive power, durability, and defense power, and attack level enhancement power of the item. For example, the defensive power value of leather armor is neutralized by the attack power of an arrow formed of iron. Further, the defensive power value of a shield formed of iron may significantly neutralize the attack power of an arrow formed of iron. As such, all items created at the item creation base may be given unique values through computation by the artificial intelligence unit 350, and the data value of each item may be identified when the user desires.

The present invention is characterized by being started without flamboyant design or story unlike conventional games. Like drawing on blank paper, the user himself may create desired items in a space set by the operator, through the item creation base and apply the created items while playing game. The user may also create characters as his desired images and develop them. In other words, the game is one that the user makes and develops. In the game, the operator supplements the system to allow the user to more effectively develop and apply items, and the user may develop and apply his desired items to his heart. Further, the game prompts development of new items and adjustment of the number of created items as the free market is operated so that the material price is determined according to the demand and supply.

The resource management unit 360 may exchange, purchase, and sell at least one, or a combination of at least one, of agriculture, fishery, aquaculture, forestry, food, energy, and mineral resources produced or extracted from at least one real estate object of the space database. Here, the amount of resources produced or extracted may be changed based on real-time environment information about the area in which at least one real estate object is located.

When a battle game is played between at least one player of at least one user terminal 100, the sharing unit 370 may relay the battle game in realtime and extract, as a highlight image, frames selected under a preset condition, and upload it to the multimedia platform. Here, the preset condition is a condition where replies for each frame during realtime relay are counted, the frames are sorted in order from most replies to least replies and, in the sorted frames, the number of replies is increased in the form of an impulse, and the sharing unit 370 may extract the image where the number of replies is increased in the form of an impulse as a highlight image. When a fun event occurs or an interesting game is played on the realtime relay screen, the users' realtime reactions sharply increase. This may be identified from the graph of values in which the frequency or number of replies is increased per preset unit time. A portion where an impulse occurs, i.e., a portion where the frequency or number of replies is suddenly increased, may be selected as a highlight. Accordingly, in the game according to an embodiment of the present invention, there is no synopsis image, impressive matches during daily battle may be provided, as highlight images, through, e.g., YouTube, and continuous contexts may be briefed to users.

Further, according to an embodiment of the present invention, the environment may be dynamically changed, and this may be changed based on the above-described user propensity information. In other words, to dynamically change the game environment based on information obtained through user propensity modeling, it is required to consider whether a certain game environment variable is able to lead to a change to the user's action pattern. Through this process, the user may receive feedback for his action pattern, and this affects the action pattern that the user is to perform in the future. Accordingly, the game environment is changed with the user's action pattern, and such change leads to changes to the user's propensity model. Such structure is a cyclic structure. Such a cyclic structure may form one cycle and this has a steady influence on the overall game. To change the game environment, e.g., the user action of fear, calmness, continuous attack, and intensive attack may be set as changing at least one or, a combination of at least one, of enemy type, field type, space size, and item type, and the connection to each node may have a different weight. Thus, the structure of the game may steadily interact with the user's action pattern. In other words, the intentions expressed while the user plays game are classified into a plurality of types and are classified again as a pattern capable of reflecting the characteristic best. According to such a rule, the user's action patterns are represented as propensity models independent from each other, and the propensity models are largely divided into one representing the user's psychology and one representing the action to achieve the goal of the game. It is possible to adjust the environment variables that may affect the user's actions through the so-created models.

For example, changes may be made to each item, such as the type of enemy, the type constituting terrain, the range of a playable area, or type of the item.

Operations of each component of the item creation service providing server of FIG. 2 are described below in detail with reference to FIG. 3. However, what is described below is merely an example, and embodiments of the disclosure are not limited thereto.

Referring to FIG. 3, (a) the item creation service providing server 300 collects and builds space data, (b) creates a character to correspond to the design and creation condition, (c) builds an item according to the user's settings and design, and (d) allows the game to be enjoyed in the space environment designed by the user using the character or item created by the user, and this is uploaded in realtime or periodically to be shared.

What is not described regarding the method for providing an item creation service for creating an artificial intelligence-based dynamic game environment in connection with FIGS. 2 and 3 is the same or easily inferred from what has been described regarding the method for providing an item creation service for creating an artificial intelligence-based dynamic game environment in connection with FIG. 1, and no detailed description thereof is thus presented.

Figure 4:
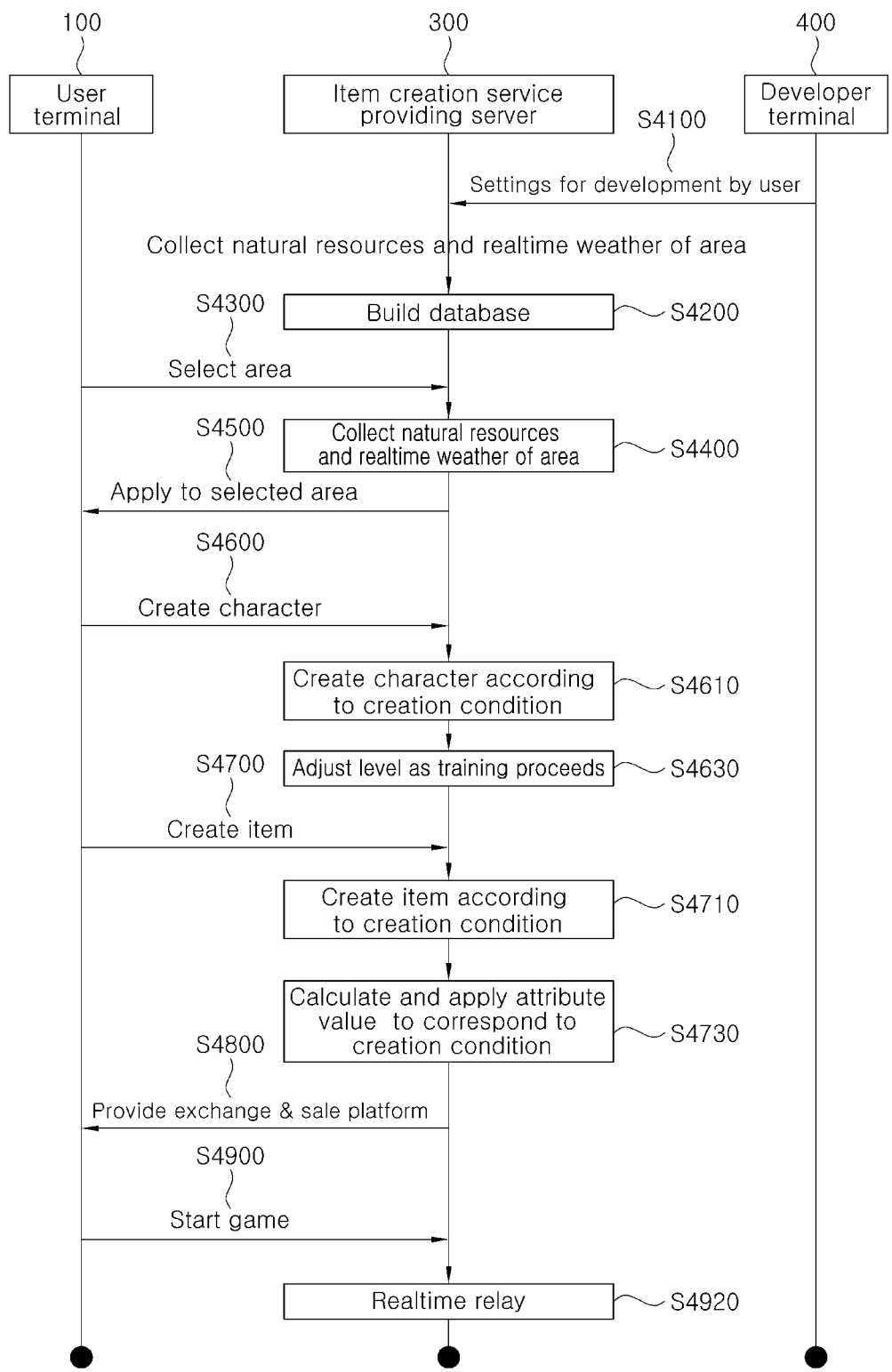
FIG. 4 is a view illustrating a process of transmitting/receiving data between components included in the item creation service providing system for creating an artificial intelligence-based dynamic game environment of FIG. 1 according to an embodiment of the present invention.

FIG. 4 is a view illustrating a process of transmitting/receiving data between components included in the item creation service providing system for creating an artificial intelligence-based dynamic game environment of FIG. 1 according to an embodiment of the present invention. An example of data transmission and reception among the components is described below with reference to FIG. 4. However, embodiments of the disclosure are not limited thereto, and it is apparent to a skilled artisan that various changes or modifications may be made thereto.

Referring to FIG. 4, the item creation service providing server 300 receives an upload of settings and a program for user development from at least one developer terminal 400 (S4100) and builds a database (S4200). In this case, if an area is selected by the user terminal 100 (S4300), the item creation service providing server 300 collects and applies natural resources and realtime weather conditions for the selected area (S4400), and applies them to the selected area (S4500). Further, when the user terminal 100 creates a character (S4600), the item creation service providing server 300 creates a character according to the creation condition (S4610) and, as training proceeds, automatically adjusts the level (S4630).

When the user terminal 100 creates an item (S4700), the item creation service providing server 300 creates an item according to the creation condition (S4710) and calculates an attribute value to correspond to the creation condition, and apply the attribute value (S4730). Further, the item creation service providing server 300 allows the user terminal 100 to use the exchange and sale platform (S4800) and, when at least one user terminal 100 starts a game (S4900), share it (S4920).

The order of the above-described steps S4100 to S4920 is merely an example, and embodiments of the disclosure are not limited thereto. In other words, the above-described steps S4100 to S4920 may be performed in a different order, or some of the steps may be simultaneously performed or omitted.

What is not described regarding the method for providing an item creation service for creating an artificial intelligence-based dynamic game environment in connection with FIG. 4 is the same or easily inferred from what has been described regarding the method for providing an item creation service for creating an artificial intelligence-based dynamic game environment in connection with FIGS. 1 to 3, and no detailed description thereof is thus presented.

Figure 5:
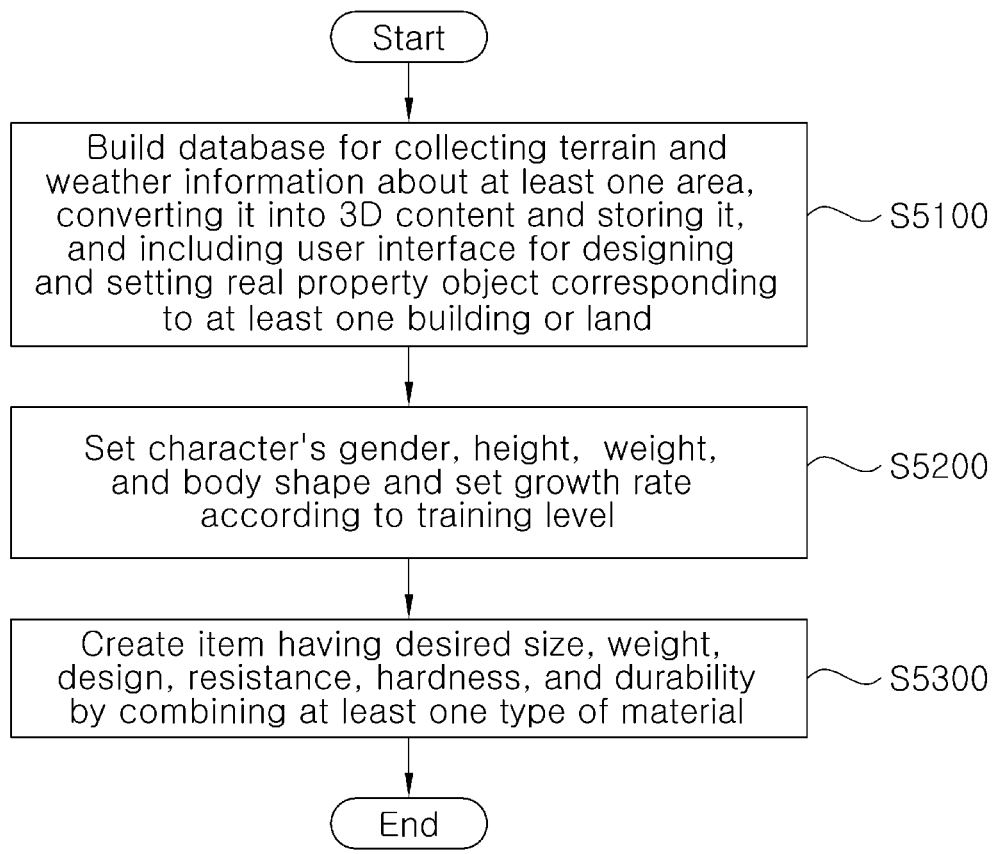
FIG. 5 is a flowchart illustrating operations of a method for providing an item creation service for creating an artificial intelligence-based dynamic game environment according to an embodiment of the present invention.

FIG. 5 is a flowchart illustrating operations of a method for providing an item creation service for creating an artificial intelligence-based dynamic game environment according to an embodiment of the present invention. Referring to FIG. 5, the item creation service providing server collects terrain and weather information about at least one area, convert it into 3D content and store the 3D content and provides a user interface for designing and setting real estate objects corresponding to at least one building or land (S5100).

The item creation service providing server provides a user interface for setting the gender, height, weight, and body shape of the character and setting a growth level according to the training level (S5200) and creates an item having a desired size, weight, design, resistance, hardness, and durability by combining at least one type of material (S5300).

What is not described regarding the method for providing an item creation service for creating an artificial intelligence-based dynamic game environment in connection with FIG. 5 is the same or easily inferred from what has been described regarding the method for providing an item creation service for creating an artificial intelligence-based dynamic game environment in connection with FIGS. 1 to 4, and no detailed description thereof is thus presented.

The method for providing an item creation service for creating an artificial intelligence-based dynamic game environment according to an embodiment described with reference to FIG. 5 may be implemented in the form of a recording medium or computer-readable medium containing computer-executable instructions or commands, such as an application or program module executable on a computer. The computer-readable medium may be an available medium that is accessible by a computer. The computer-readable storage medium may include a volatile medium, a non-volatile medium, a separable medium, and/or an inseparable medium. The computer-readable medium may include a computer storage medium. The computer storage medium may include a volatile medium, a non-volatile medium, a separable medium, and/or an inseparable medium that is implemented in any method or scheme to store computer-readable commands, data architecture, program modules, or other data or information.

According to an embodiment, the above-described method for providing an item creation service for creating an artificial intelligence-based dynamic game environment may be executed by an application installed on a terminal, including a platform equipped in the terminal or a program included in the operating system of the terminal), or may be executed by an application (or program) installed by the user on a master terminal via an application providing server, such as a web server, associated with the service or method, an application, or an application store server. According to an embodiment, the above-described method for providing an item creation service for creating an artificial intelligence-based dynamic game environment may be implemented in an application or program installed as default on the terminal or installed directly by the user and may be recorded in a recording medium or storage medium readable by a terminal or computer.

Although embodiments of the present invention have been described with reference to the accompanying drawings, It will be appreciated by one of ordinary skill in the art that the present disclosure may be implemented in other various specific forms without changing the essence or technical spirit of the present disclosure. Thus, it should be noted that the above-described embodiments are provided as examples and should not be interpreted as limiting. Each of the components may be separated into two or more units or modules to perform its function(s) or operation(s), and two or more of the components may be integrated into a single unit or module to perform their functions or operations.

It should be noted that the scope of the present invention is defined by the appended claims rather than the described description of the embodiments and include all modifications or changes made to the claims or equivalents of the claims.

The invention claimed is:

1. An item creation service providing system for creating an artificial intelligence-based dynamic game environment, comprising:
   an item creation service providing server including a space database collecting terrain and weather information about at least one area, converting the collected information into 3D content, storing the 3D content, and including a user interface for designing and setting a real property object corresponding to at least one building or land, a character setting unit including a user interface for setting a character's gender, height, weight, and body shape and setting a growth rate according to a training level, and an item creating unit creating an item having a desired size, weight, design, resistance, hardness, and durability by combining at least one type of material; and
   a user terminal defining and designing at least one attribute constituting a space, character, and item in the item creation service providing server and selling, purchasing, and exchanging a completed item.

2. The item creation service providing system of claim 1, wherein the item creation service providing server further includes a price setting unit adjusting a price to a price corresponding to a point where demand and supply curves meet based on demand and supply of the item created by the user terminal.

3. The item creation service providing system of claim 2, wherein the price setting unit sets the price of the item to correspond to a realtime price of a material constituting the item created by the item creating unit.

4. The item creation service providing system of claim 1, wherein the item creation service providing server further includes an artificial intelligence unit calculating and quantifying a resistance, hardness, and durability corresponding to the material of the item created by the item creating unit, a component of the material, a ratio of the component, size, and weight and generating and assigning item attribute values including a use distance, attack power, destructive power, durability, defense power, and attack level enhancement power corresponding to the quantified data.

5. The item creation service providing system of claim 4, wherein the artificial intelligence unit generates and assigns the item attribute value to correspond to the realtime value of the material of the item created by the item creating unit.

6. The item creation service providing system of claim 1, wherein the character setting unit sets at least one parameter to change a power level, attack level, and resourcefulness level of the character as the character is grown and trained.

7. The item creation service providing system of claim 1, wherein the item creation service providing server further includes a resource management unit exchanging, purchasing, and selling at least one, or a combination of at least one, of agriculture, fishery, aquaculture, forestry, food, energy, and mineral resources produced or extracted from at least one real estate object of the space database, wherein an amount of the resources produced or extracted is changed based on realtime environment information about an area where the at least one real property object is located.

8. The item creation service providing system of claim 1, wherein the character setting unit grows the character using at least one, or a combination of at least one, of a general trainer, a special trainer, a nutritionist, a teacher, and a mentor provided by a developer terminal interworking with the item creation service providing server.

9. The item creation service providing system of claim 1, wherein the item creation service providing server further includes a sharing unit relaying a battle game in realtime when the battle game is played between at least one player of at least one user terminal, extracting, as a highlight image, frames selected under a preset condition, and uploading the highlight image to a multimedia platform.

10. The item creation service providing system of claim 9, wherein the preset condition is a condition where replies during the realtime relay are counted per frame, the frames are sorted in order from most replies to least replies, and the replies are increased in a form of an impulse among the sorted frames, and wherein the sharing unit extracts an image of the frame where the replies are increased in the form of the impulse, as the highlight image.

* * * * *